United States Patent [19]

Zenbayashi et al.

[11] Patent Number: 4,882,470
[45] Date of Patent: Nov. 21, 1989

[54] BORING DEVICE FOR OPENING PASSAGES TO BRANCH PORTIONS OF A LINED MAIN PIPE LINE

[75] Inventors: Katsuaki Zenbayashi, Fujisawa; Hisao Otsuga, Yokohama; Akio Morinaga, Fujisawa; Osamu Toyoshima, Takatsuki; Shinji Shimokawa, Osaka, all of Japan

[73] Assignees: Tokyo Gas Kabushiki Kaisha, Tokyo; Ashimori Kogyo Kabushiki Kaisha, Osaka, both of Japan

[21] Appl. No.: 184,489
[22] PCT Filed: Aug. 19, 1986
[86] PCT No.: PCT/JP86/00428
 § 371 Date: Apr. 19, 1988
 § 102(e) Date: Apr. 19, 1988
[87] PCT Pub. No.: WO88/01222
 PCT Pub. Date: Feb. 25, 1988
[51] Int. Cl.[4] .............................................. H05B 3/54
[52] U.S. Cl. ................................... 219/523; 219/277; 219/535
[58] Field of Search ............... 219/523, 277, 278, 535, 219/213; 408/127; 254/134.3 FT; 15/104.33

[56] References Cited

U.S. PATENT DOCUMENTS

| | | | |
|---|---|---|---|
| 1,174,444 | 3/1916 | Quain | 219/278 |
| 2,516,950 | 8/1950 | Bragg | 219/523 |
| 3,275,803 | 9/1966 | True | 219/535 |
| 4,359,627 | 11/1982 | Takeichi | 219/523 |
| 4,641,016 | 2/1987 | Garcia | 219/523 |
| 4,795,885 | 1/1989 | Driggers | 219/535 |

FOREIGN PATENT DOCUMENTS 58-219189 6/1985 Japan.
59-100548 3/1986 Japan.

Primary Examiner—Teresa J. Walberg
Attorney, Agent, or Firm—Birch, Stewart, Kolasch & Birch

[57] ABSTRACT

A boring device for a lining material in a branched portion of a lined pipe such as a gas-conduit or a city water pipe line to which the lining material has been applied, which device includes a tension coil spring 1, a compression coil spring 2 being connected to the tip of the tension coil spring and having a spring constant smaller than that of the tension coil spring, a head element 5 in the form of a circular truncated cone being connected to the tip of the compression coil spring 2 and having an electric heat-generating device 3 coated with a thermoplastic resin and a single or plural transmission wires 9 being connected to the heat-generating device 3 and being passed in a loosened state through the tension coil spring 1 and the compression coil spring 2, the transmission wires 9 being fixed within the tension coil spring 1 at plural points, and a device N provided in rear of the tension coil spring for rotatably extending the device.

10 Claims, 9 Drawing Sheets

1

BORING DEVICE FOR OPENING PASSAGES TO BRANCH PORTIONS OF A LINED MAIN PIPE LINE

BACKGROUND OF THE INVENTION

1. Field of the Invention

The present invention relates to a boring device for a lining material having been applied onto the inner surface of a pipe line having a branched portion, which device can bore the lining material in the branched portion to communicate the branched pipe line to the main pipe line, and more particularly, to a boring device which is inserted from the branched pipe line having a smaller diameter and to the branched portion where the lining material is bored.

2. Description of the Prior Art

In general, a lining treatment for pipe lines, chiefly those buried in the ground, such as gas conduits and city water pipe lines, is carried out for the purpose of repairing or reinforcing the pipe lines.

As a method for lining, there is known a method which is carried out in such a manner that a tubular lining material made of a flexible material, which has been provided on the inner, leading surface thereof with a binder, is annularly fixed at one end thereof and fluid pressure is applied to the back surface of the annularly fixed portion to form a turning point such that the lining material is turned inside out which allows the turning point to advance within the pipe line thereby inserting the evaginated lining material into the pipe line, while pressing the surface of the lining material, onto which the binder has been applied, against the inner surface of the pipe line by the fluid pressure and solidifying the binder to effect bonding. This method has a number of merits. It is unnecessary to dig up a pipe line over its full length and the method is operable simply by digging the pipe line only at both terminal ends thereof to be treated, and the lining work itself can be done within a very short period of time even for a long pipe line. In recent years, therefore, this method has attracted special public attention.

In case a pipe line is lined according to this method wherein a tubular lining material is bonded to the entire inner surface of the pipe line, however, a passage with branch pipe lines off the main pipe line will have their entrances blocked. In the case of a gas conduit, for example, such problem will not arise in a high or middle pressure pipe line as a trunk conduit, because the line is usually devoid of any branched portion. In the case of a terminal low pressure pipe line, however, there are a number of branched supply pipe lines for supplying gas according to the unit of users, for example, the number of families.

Thus, the passages to the supply pipe lines will be blocked when the low pressure pipe line is lined according to the above mentioned method. In such a case, digging up the branched portions from the ground for boring the lining material after the lining treatment will make no substantial difference from digging up the entire pipe line over its full length, thus losing the greatest merit of this lining method.

Accordingly, there is a demand for developing a simple and easy means for boring the applied lining material at the branched portions after the pipe-lining treatment to communicate the branched pipe lines to the main pipe line without digging up the branched portion from the ground.

A method is known wherein a cart movable by remote control and a device for detecting a branched portion to a branched pipe line, such as a TV-camera, movable together with the cart, are disposed within a lined pipe line, and a boring head installed on the cart is moved freely in both circumferential and radial directions within the pipe line to the branched portion by remote operation to bore the lining material blocking a path to the branched pipe line (British Pat. No. 2,092,493).

In this device for boring, however, a means for exactly detecting the position of an opening to a branched pipe line on the inner surface of the lined pipe line is quite necessary and a driving means for moving the boring head is also necessary so that the device becomes inevitably complicated as a whole. Thus, such a device and method cannot be applied to a pipe line having bends or to a pipe line of a small diameter.

A method disclosed in Japanese Laid-open Patent Appln. No. Sho. 55-41274 is known, for example, as a method for boring a lining material at branched portions of a pipe line after applying the lining material onto the pipe line, without digging it up from the ground. This method comprises introducing an insert mass having a flexible conduit passing through the central core of the mass and extending backward into a branched portion of a pipe line the inner surface of which has been bonded to the lining material, allowing pressure to act on the back of the insert mass while evacuating the air occupying the space in front of the insert mass through the flexible conduit thereby leading the flexible conduit to the opening for the branched pipe line, and thereafter sending a hot blast through the flexible conduit to the lining material bonded to the pipe line to bore it by fusion.

Another method is disclosed in Japanese Laid-open Patent Appln. No. Sho. 58-49211 wherein an opening to a branch portion existing in a pipe line is once clogged with a stopper prior to the application of a lining material and the stopper is then allowed, after the application of the lining material, to become exothermic to use itself as a heating tool thereby boring the lining material bonded to the stopper by fusion.

According to the above known prior art wherein the insert mass or the stopper is allowed to advance and become located at the branched portion of the pipe line by fluid pressure, however, it is extremely difficult in the case of a small and multiple complicated bent branched pipe line to lead the insert mass or the stopper to the branched portion by fluid pressure.

As the method disclosed in the above-mentioned Japanese Laid-open Patent Appln. No. Sho. 55-41274 wherein the boring operation has to be performed by a hot blast, the boring operation is not easy. In addition, since a portion of the binder will flow into the branched pipe line and is solidified therein on bonding the lining material to the inner surface of the main pipe line, it is extremely difficult to fuse the lining material including such solidified binder for effecting the boring.

In the method disclosed in the above-mentioned Japanese Laid-open Patent Appln. No. Sho. 55-49211 wherein the stopper has to be initially mounted to the branched portion prior to the application of the lining material, it is not easy to mount the stopper correctly to the opening of the branched portion. Further, this method has such a drawback that it cannot be applied to a pipe line to which a lining material has already been applied.

Under such circumstances, the present inventors have already invented a boring device which comprises a first flexible coil spring, a second more flexible compression coil spring connected to the front end of the first coil spring and an electric heater mounted to the tip of the second coil spring, operated in such a manner that the springs are introduced into a pipe line while rotating the first coil spring so as to allow the electric heater to locate in the branched portion, and electricity is sent to the heater to burn out the lining material. This approach is applicable to a pipe line for which the lining treatment has been finished, and is capable of being led to the branched portion through a branched pipe line having a small diameter and being curved and bent, and easily capable of boring the lining material even in the case of the branched pipe line having been filled with a large amount of a binder flowed thereinto (Japanese Laid-open Utility Model Appln. No. Sho. 61-39400).

In this device wherein the boring device is introduced while rotating the first coil spring and rotationally shaking the front electric heater by the resiliency of the second coil spring, however, the electric heater may thrust, at a joint such as LM joint in the pipe line, into a slit between the end of a straight pipe and the joint whereupon the weaker second coil spring buckles and is damaged to make it impossible to move the heater forward beyond that point. Accordingly, the present inventors further developed a boring device wherein the electric heater is surrounded with a thermoplastic resin to shape a block approximately in the form of a circular truncated cone mounted at the tip of the second coil spring (Japanese Utility Model Appln. No. Sho. 60-18915).

The device disclosed in the above mentioned Japanese Utility Model Appln. No. Sho. 60-18915 wherein the electric heater is shaped to have a slanted side surface by coating with a thermoplastic resin can smoothly be moved forward within the branched pipe line in compliance with the curvature of the pipe line, avoiding a step formed at the LM joint or the like and a barrier, such as flash. However, quite often the electric heater led to the branched portion did not function to send electricity thereto.

This situation caused by disconnection of the transmission wires is a phenomenon occurring in the coating of the resin or within the coil spring. It is apparent that this is ascribable to the transmission wires being twisted off.

SUMMARY OF THE INVENTION

The present invention provides a boring device for a lining material for pipe lines, which overcomes the above mentioned problems. The present invention firstly provides a boring device for a lining material for pipe-lines which comprises a tension coil spring, a compression coil spring connected to the tip of the tension coil spring and having a spring constant smaller than that of the tension coil spring, a head element in the form of a circular truncated cone connected to the tip of the compression coil spring and comprised of an electric heat-generating means coated with a thermoplastic resin and single or plural transmission wires connected to the electric heat-generating means being passed in a loosened state through the compression coil spring and the tension coil spring, the transmission wires being fixed within the tension coil spring at plural points, and a means provided at the rear of the tension coil spring for extending the spring in a rotational manner.

The present invention also provided a boring device of the above mentioned type, wherein an electric circuit is provided capable of electrically detecting a change in rotation speed of a rotor and transmitting the change to the means for extending the spring so as to stop the rotation thereof and the extension of the tension coil spring.

The present invention further provides a boring device of the above mentioned type, wherein the electric circuit is provided with a proximity switch associated with the compression coil spring capable of detecting a change in impedance occurring in the switch on its use and transmitting the change to the means for rotatably extending the tension coil spring so as to stop the rotation and extension of the tension coil spring.

The present invention still further provides a boring device of the above mentioned type, wherein the head element is provided with a thermocouple capable of detecting an electromotive force occurring in the thermocouple on its use and transmit the force to the means for rotatably extending the tension coil spring so as to stop the rotation and extension of the tension coil spring.

DETAILED DISCUSSION

The boring device of the present invention will now be explained in more detail with reference to the accompanying drawings.

Figure 1:
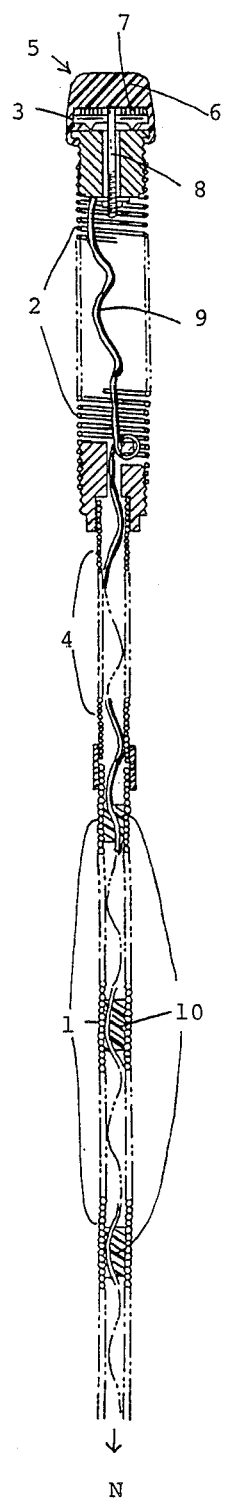
FIGS. 1 and 2 are respectively central longitudinal cross section views showing an example of the boring device of the present invention.

FIG. 1 shows one example of the boring device of the present invention. In FIG. 1, a tension coil spring 1 is provided in its rear end with a means for rotatably extending the coil spring (not shown in FIG. 1 but designated simply as "N"). A commercially available drain cleaner or the like can be used as the device N. As the tension coil spring is pushed forward and allowed to advance within a pipe line of a small diameter, however, the spring should preferably not be excessively flexible.

In FIG. 1, a compression coil spring 2 is connected through another compression coil spring 4 to the front end of the tension coil spring 1. The compression coil spring connected to the front end of the tension coil spring may be two compression coil springs connected in series having different spring constants. In this case, the spring constant of the compression coil spring 4 connected to the tension coil spring should have a value between the spring constant of the compression coil spring 2 and the spring constant of the tension coil spring 1. In the boring device of the present invention, the compression coil spring 2 alone can be used without another compression coil spring 4 so that the compression coil spring 2 may be connected directly to the tension coil spring 1. This compression coil spring 2 is approximately identical in diameter with the head element 5 and is a sufficiently flexible compression coil spring having a spring constant smaller than that of the tension coil spring 1. The spring constant of the compression coil spring 4 is within the range between the tension coil spring 11 and the compression coil spring 2 with respect to spring constant so that the compression coil spring 4 has a flexibility ranking between the tension coil spring 1 and the compression coil spring 2.

The head element 5 is provided in the central part thereof with an electric heat-generating means 3 (for example, an electrical heater) and is mounted to the tip of the compression coil spring 2. The heat-generating means 3 is covered with a thermoplastic resin 6 to form a block as a whole. The head element 5 has an outer diameter slightly smaller than the minimum diameter of a pipe line into which the boring device of the present invention is to be inserted.

Used as the heat-generating means 3 is, for example, a Ni-Cr hot plate or a relatively thick Ni-Cr wire 7 in a vortex form. Used as the thermoplastic resin 6 are elastic thermoplastic resins such as polyurethane resins, soft vinyl chloride resins and EVA resins. The electric heat-generating means 3 is covered with the resin and shaped into a block in the form of a circular truncated cone to form the head element 5.

The outer end of the hot panel or hot wire 7 of the heat-generating means 3 is connected to the tension coil spring 1 through the compression coil springs 2 and 4 while the inner end of the hot panel or hot wire 7 is connected to a transmission wire 9 through a screw 8. The transmission wire 9 extends backward in a sufficiently loosened state through the compression coil springs 2 and 4 and the tension coil spring 1. This state can be achieved by passing the transmission wire 9 through the coil springs in a stretched state, rewinding the coil springs circularly and again drawing out the coil springs to the original position. The transmission wire 9 is passed through the compression coil springs in a loosened state but is fixed in a suitable manner at a proper interval to the tension coil spring 1. In this example, the transmission wire 9 is passed through the coil spring in a stretched state on a platform and then the coil spring is wound up circularly whereby the valleys of the spring are opened. A thermoplastic resin 10, such as EVA resin, is injected into the valleys and then cooled whereby the transmission wire 9 is easily fixed to the tension coil spring 1. Any thermoplastic resin such as that used to form the head element 5 can be used.

Figure 2:
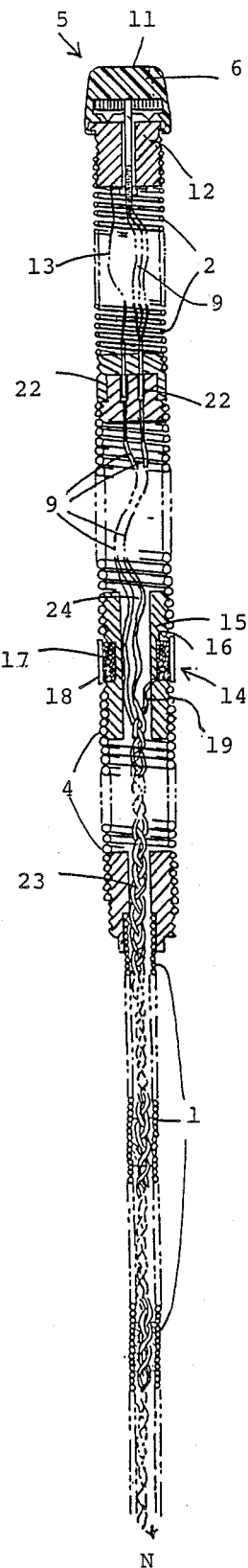
Figure 2:
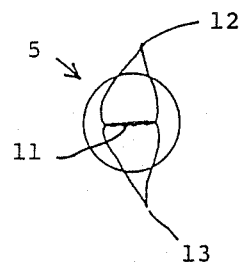

Referring to FIGS. 2A and 2B, another example is explained wherein plural transmission wires 9 are passed through the coil springs. Thermocouple 11 is a heat-sensing means. The head element 5, shaped with the thermoplastic resin 6 into a block, is provided on the top with the thermocouple 11 having a first lead wire 12 extending therefrom connected to the tension coil spring 1 through the compression coil springs 2 and 4 and a second lead wire 13 extending backwards through the interior space of the compression coil springs 2 and 4 and the tension coil spring 1.

On boring the lining material of the pipe line with the boring device of the present invention, the thermocouple 11 functions as follows. After pressing the lining material onto the inner surface of the pipe line by the aid of a binder, a warming pressurized fluid is allowed to enter and flow through the interior space of the pipe line to warm the lining material while pressing it against the inner surface of the pipe line to cure the binder. Illustrative of the warming pressurized fluid are warm water, hot blast (air), steam and a mixture of steam and hot blast. These fluids may be introduced into the tubular lining material from one end thereof. However, it is one of the preferred methods to introduce a hose having a great number of small pores into the interior space of the lining material and to pass the above mentioned fluid through the hose whereby the fluid is leaked out of the hose through the small pores or pinholes for warming.

The boring device of the present invention is inserted into the pipe line from one end of the branched pipe line and positioned at the branched portion while bonding the binder in such manner. The front end of the boring device, i.e. the head element 5, is introduced into the branched pipe line from the terminal end thereof and the tension coil spring 1 is allowed to proceed within the branched pipe line while rotating the coil spring.

Figure 5:
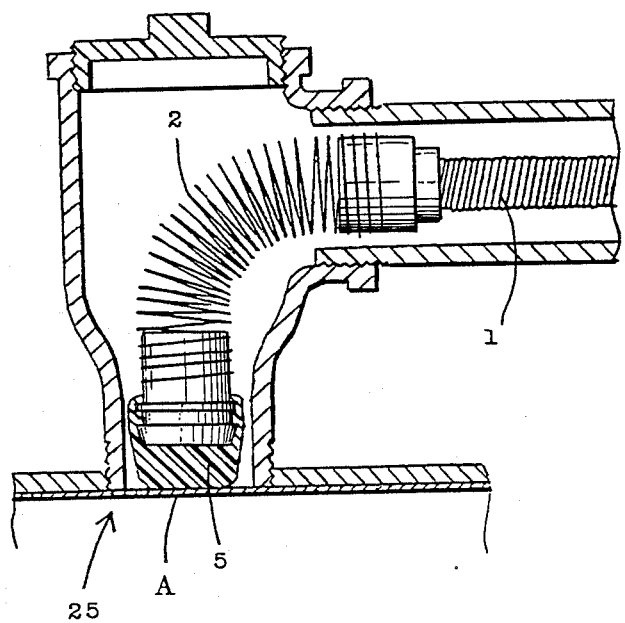
FIG. 5 is a diagram showing the state of the head element of the boring device of the present invention abutting against the lining material A in the branched portion.
Figure 8:
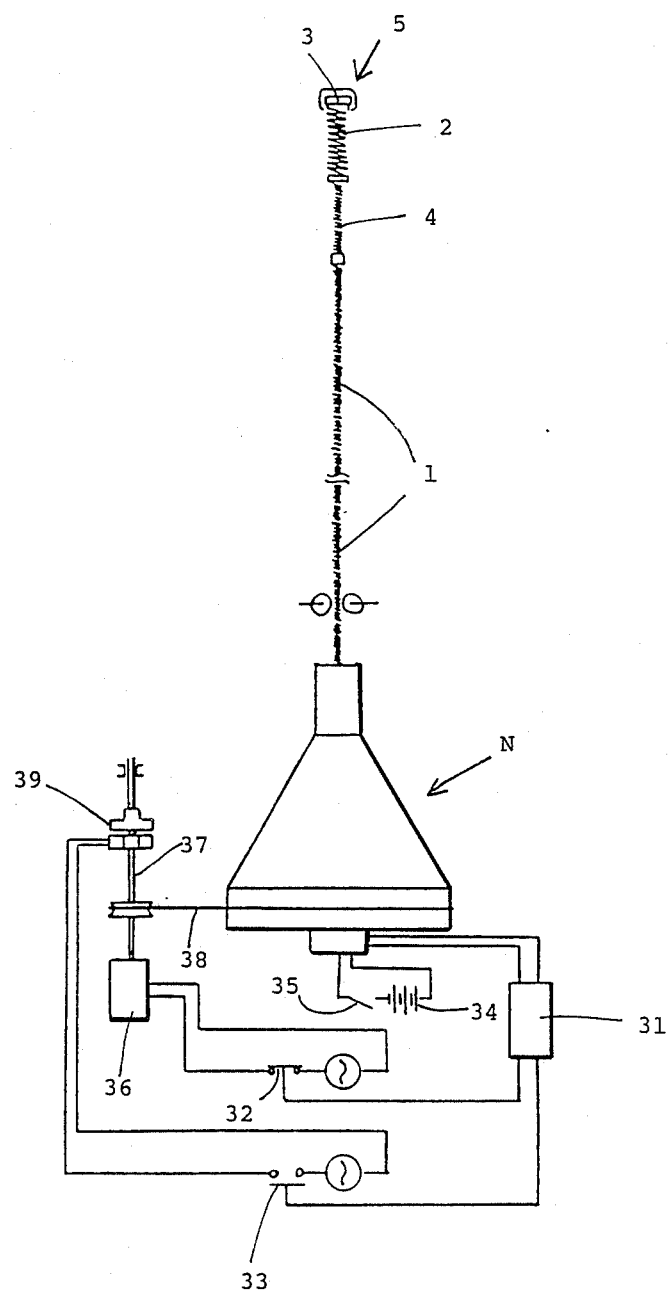
FIG. 8 is a diagram showing an example of the electric circuit wherein the head element is provided with a thermocouple or the compression coil spring with the proximity switch.

When the front end of the boring device, i.e. the head element 5, reaches the branching portions of the branched pipe line, the head element 5 is maneuvered to abut against the outer surface of the lining material blocking the passage to the branch of the pipe line (FIG. 5). As the lining material is warmed by the warming pressurized fluid, the heat is detected by the thermocouple 11 mounted at the top of the head element 5 whereby the difference in voltage created between the lead wires 12 and 13 (electromotive force) is detected by a temperature detector. The detected difference in voltage is transmitted to a means for rotatably extending the tension coil spring. An electric circuit is provided so as to stop the rotation and extending of the tension coil spring by transmission of the difference in voltage. One example of such an electric circuit is shown in FIG. 8. Referring to FIG. 8, the difference in voltage is detected by a temperature detector 31 whereby a switch 32 normally implemented for turning on a motor 36, is turned off to stop the operation of the motor 36, while turning on a switch 33 normally implemented for turning off an electromagnetic brake 39, to actuate the electromagnetic brake 39 for stopping a shaft 37 thereby stopping the rotating and extension of the means for rotatably extending out the tension coil spring 1 driven by a belt 38. As a result, the head element 5 of the boring device is kept in contact with the lining material at the branched portion.

A proximity switch 14 is present for detecting the arrival of the electric heater 3 at the branched portion. This proximity switch 14 is installed between the compression coil spring 2 and the compression coil spring 4 in such a manner that a cylinder 15 made of a synthetic resin has a groove 16 on its outer surface and a coil 17 of an enamel wire is provided in the groove 16. The coil 17 is overlaid with a protective tube 18 and a lead wire 19 from the coil 17 extends backwards through the compression coil spring 4 and the tension coil spring 1.

Figure 7:
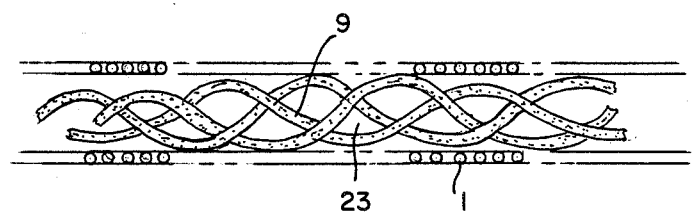
FIG. 7 is a diagram showing the state of the transmission wires in the boring device of the present invention being knitted.

In this example, the transmission wires 9 from the head element and the lead wires 13 and 19 from the thermocouple 11 are the proximity switch 14, respectively, are previously kept in loosely knitted state 23 (FIG. 7) and passed through the tension coil spring in a well loosened state 24. As in the case of the previous example, the transmission wires 9 or the lead wires 13 and 19 are fixed to the tension coil spring 1.

On boring the lining material of the pipe line with the boring device of the instant invention, the proximity switch 14 functions as follows. The boring device provided with the proximity switch 14 is used, prior to applying a lining to the main pipe line, in such a manner that the boring device is inserted from one end of the branched pipe line toward the branched portions and the front end of the boring device, i.e. the head element 5, is located at a given position of the branched portion prior to the lining treatment of the main pipe line. Prior to the lining treatment, the boring device of the invention is inserted from the end of the branched pipe line and allowed to advance toward the branched portion. In this case, the proximity switch 14 is allowed to advance while keeping the device close to the inner surface of the branched pipe line. When a high frequency current is sent to the coil 17 from an amplifier 31 (FIG. 8) having a high frequency emission circuit, any change is detected by the impedance produced therein.

When the front end of the boring device of the invention reaches the branching portion and is allowed to advance further and enter in the main pipe line, the portion of the device provided with the proximity switch 14 also enters in the main pipe line whereupon the wall surface of the branched pipe line around the periphery of the proximity switch no longer exists and thus a change occurs in impedance of the coil 17. An electric circuit is installed so as to stop the rotation and extension of the tension coil spring by this change in impedance. Such electric circuit can be explained by utilizing FIG. 8. Referring to FIG. 8, the change in impedance is detected in the amplifier 31 to turn off the normally turned-on switch 32 for the motor 36 to stop the sending of electricity thereto and on the other hand to turn on the normally turned-off switch 33 for the electromagnetic brake 39 for sending electricity thereto whereupon the rotation of the shaft 37 is stopped as is the rotatable extension of the tension coil spring 1. As a result, the advance of the boring device is stopped just after the portion provided with the proximity switch 5 is allowed to enter the main pipe line.

Next, the rotation of the device N for rotatably extending the spring is reversed to pull back the tension coil spring 1 by a distance corresponding to the length from the proximity switch 14 to the head element 5 whereby the head element 5, provied with the electric heater 3, can be located exactly in a given pipe of the branched portion.

The main pipe line is then lined with a lining material under pressure. The opening to the branched pipe line is blocked with the lining material applied to the main pipe line by this lining treatment. This state is shown in FIG. 5.

In each of the above examples, the individual coil springs can freely be connected or disconnected by way of a connector 22, including connection or disconnection of transmission wires passing through the individual coil springs. In this case, the shape and mechanism of the connector, as well as connection and joint of the electric system, can properly be selected.

In order to introduce the boring device of the present invention into the branched pipe line, the front end of the device provided with the head element 5 is inserted into the branched pipe line from the terminal end thereof and moved forward while rotating the tension coil spring.

Figure 3:
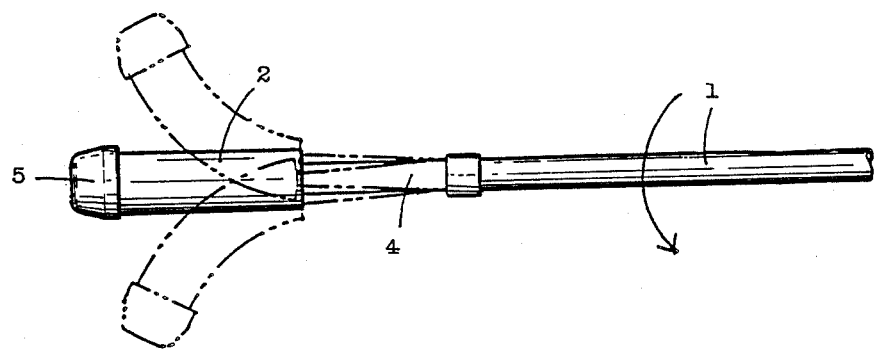
FIG. 3 is a diagram showing the state of the boring device of the present invention being pushed forward while being rotated.

When the tension coil spring 1 is rotated, the compression coil spring 2 is also rotated through the other compression coil spring 4 and rotationally shaken while shaking the head element as shown in FIG. 3, since the compression coil spring 2 is more flexible than the tension coil spring. At a bend portion of the pipe line, the head element 5 is moved forward smoothly along the bend while detecting the direction of the bend. As the head element 5, including the electric heater 3 covered with a thermoplastic resin 6, is shaped to have a slanted side surface, the head element 5 is moved forward smoothly within the pipe line, avoiding the end of the straight pipe or end stopper at LM joints and the like.

The rotation force is also applied to the transmission wires passing through the coil springs. As the transmission wires are fixed within the tension coil spring at a proper distance to the spring, the rotation force is transmitted to the front end of the transmission wires in the lengthwise direction thereof.

Figure 4:
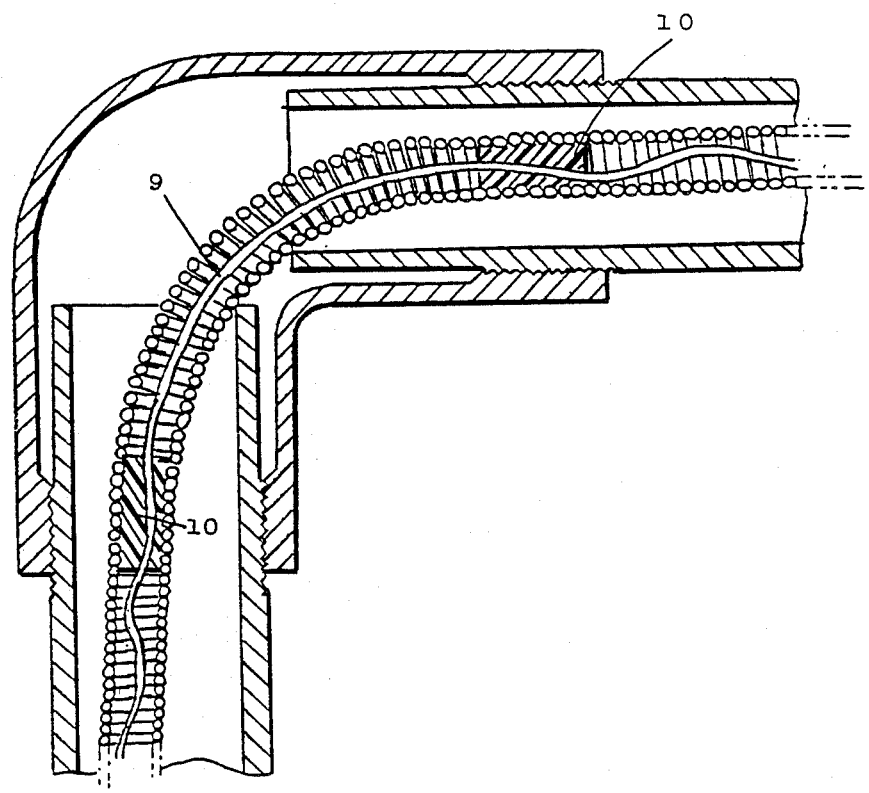
FIG. 4 is a diagram showing the state of a part of the coil spring of the boring device of the present invention being passed through a bend of a pipe line.

As the transmission wires are passed through the coil springs in a loosened state, there is no fear of disconnection even if the coil springs are somewhat elongated whenever the coil springs pass through a bend, so that the transmission wires are allowed to pass, together with the coil springs, through the branched pipe line without any damage (FIG. 4).

Figure 6:
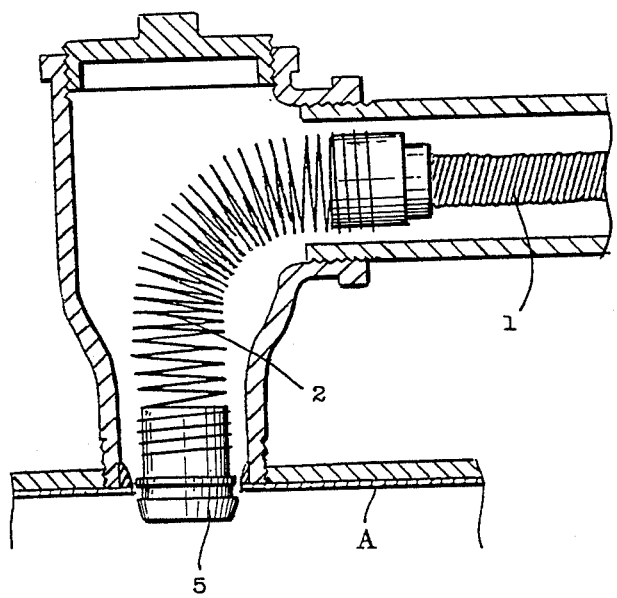
FIG. 6 is a diagram showing the state of the lining material A being bored.
Figure 9:
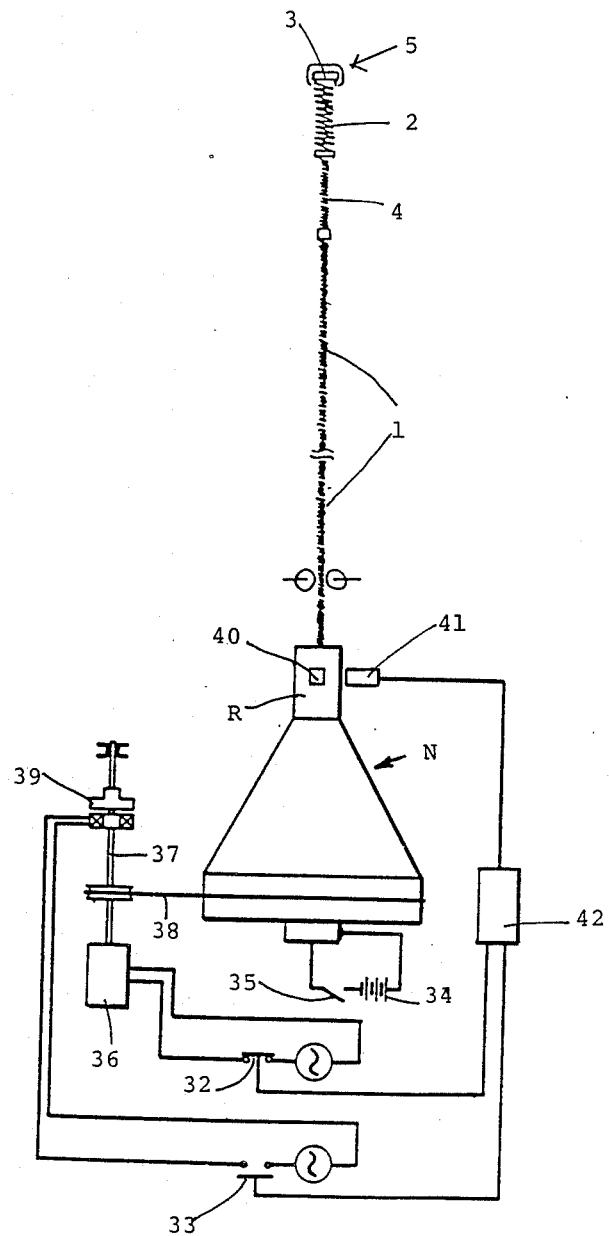
FIG. 9 is a diagram showing one example of the electric circuit in the case of the boring device of the present invention provided with a means positioned in read of the tension coil spring for rotatably extending the device with a means for electrically detecting a change in rotation speed of the rotor.

When the head element 5 reaches the branched portion 25 of the branched pipe line (FIG. 5), the rotation and extending of the tension coil spring 1 are stopped and the head element 5 is allowed to abut against the lining material A blocking the path to the branch portion of the pipe line at the branched portion by the resiliency of the compression coil spring 2, as shown in FIG. 5. A switch for the head element is turned on in this state to send electricity to a hot plate or wire 7 to actuate the electric heater 3 whereby the thermoplastic resin 6 covering it is made molten and the lining material A is then made molten and bored by the self-weight of the head element 5, the resiliency of the compression coil spring 2 and the heat generated by the electric heater 3 (FIG. 6), switch 35 and the electric source 34 (FIGS. 8 and 9).

In an embodiment of the boring device of the invention, an electric circuit can be installed which is capable of electrically detecting a change in rotation speed of a rotor in the means for rotatably extending the tension coil spring and transmitting the change to the means for rotatably extending the tension coil spring to stop the rotation and extending of the tension coil spring. An example of such an electric circuit is shown in FIG. 9. Referring to FIG. 9, the circuit shown therein is provided with the means N for rotatably extending the tension coil spring 1 having a rotor R equipped with a reflection tape 40 on a part of its peripheral surface and is also provided with a photoelectric switch 41 as a non-contact output-type switch located in a position near to the locus of the rotor R. The photoelectric switch 41 is connected to a motion detector 42 which records the signal from the switch 41 as a pulse and measures the time interval between pulses. If the time interval exceeds a given length, a normally turned-on switch 32 for a motor 36 is turned off, and on the other hand, a normally turned-off switch 33 of a circuit for an electromagnetic brake 39 is turned on.

Regarding the use of the boring device of the present invention provided with the means for electrically detecting a change in rotational speed of the rotor and transmitting the change to the means for extending the tension coil spring, the boring device functions as follows.

When the boring device of the invention is inserted into the branched pipe line and pushed forward and when the front end of the device is pushed against a step within the pipe line or a lining material A having been applied to the pipe line in the branched portion (FIG. 5), the rotation of the head element 5 becomes significantly slowed and is stopped. The rotation of the tension coil spring continues even in such a case so that the compression coil spring 2 is severely twisted. Accordingly, the rotation of the tension coil spring 1 is decelerated by the resistance of the compression coil spring 2 to increase the load on the rotor R thereby decelerating its rotation. As a result, the frequency of detecting the reflection tape 40 becomes smaller in the photoelectric switch 41 so that the interval between pulses in the motion detector 42 becomes greater. When the interval becomes larger than a given length, the motion detector 42 emits a signal whereby the normally turned-on switch 32 for the motor circuit is turned off to stop the sending of electricity to the motor 36 and, on the other hand, the normally turned-off switch 33 is turned on to actuate the electromagnetic brake 39 for stopping the rotation of the rotating shaft 37.

The rotation of the rotor R is thus immediately allowed to stop and the rotation and extending of the tension coil spring 1 is concurrently stopped to prevent any further twisting of the compression coil spring 2.

A combination of the above detecting means with the non-contact, output-type switch is not limited to a combination of the reflection tape 40 with the photoelectric switch 41. Whatever means can be applied that is suitable as far as it can detect a change in rotation speed and transmit it electrically.

In the boring device of the present invention, the transmission wires 9 and the like can be inserted in a knitted state 23 (FIGS. 2 and 7) into the coil springs whereby a uniformly loosened state can be imparted to the transmission wires 9 and the like. Thus, the transmission wires 9 and the like are not subjected discretely to elongation. Even if they are twisted, they are easily reinstated to their original state.

The boring device of the present invention provided at the front end thereof with a head element in the form of a circular truncated cone involving an electric heat-generating means covered with a thermoplastic resin can be inserted into branched pipe lines and moves forward smoothly therein even if steps and obstacles exist in the branched pipe lines.

In the boring device of the invention, the transmission wires are passed in a loosened state through the compression coil spring and the tension coil spring and fixed at plural points to the tension coil spring. Thus, there is no fear of disconnection of the transmission wires when the boring device is pushed forward within the pipe line while being rotated.

As the boring device of this invention has the head element provided at the tip thereof with a thermocouple or has the compression coil spring provided with aa proximity switch, the front end of the boring device can be allowed to arrive exactly at a lining material in the branched portion of the branched pipe line which is to be bored.

In the boring device of this invention, the means for rotatably extending the tension coil spring can be provided with a means for electrically detecting a change of rotation speed of the rotor which enables advancing and stopping of the boring device within the pipe line freely.

The boring device of this invention does not necessitate the use of any fluid pressure. Thus, no back pressure is applied to the device and the transmission wires can be passed very easily through the branched pipe line having a number of bends without being twisted.

Even if the pipe line is bent upward, the transmission wires can be passed therethrough in compliance with the bent direction. Further, the device can easily and smoothly be inserted into the branched pipe line, avoiding steps and obstacles therein.

The use of loosely knitted transmission wires can easily present the wires in a uniformly loosened state in the coil springs and make it possible to untwist the wires so that the force applied to the transmission wire can be absorbed by the whole of the transmission wires in loosely knitted form.

On boring of the lining material, the electric heater may be stained with the burned ashes and residue of the lining material and binder thereby seriously lower the boring ability of the heater on its reuse. The individual compression coil springs can thus be connected by way of connectors to make it convenient to exchange the used electric heater with a new one. Each part can be manufactured as a cartridge type part to facilitate exchange of one part with a new one. It is also convenient to use transmission wires in the compression coil spring which are finer than those in the tension coil spring so that good flexibility of the compression coil spring may not be effected.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A boring device for a lining material for pipe lines which comprises in combination a tension coil spring, a compression coil spring being connected to a tip of said tension coil spring and having a spring constant smaller than that of said tension coil spring, a head element in the form of a circular truncated cone being connected to a tip of the compression coil spring and comprising an electric heat-generating means coated with a thermoplastic resin, a single or plural transmission wires being connected to said electric heat-generating means, passed in a loosened state through said tension coil spring and said compression coil spring, said transmission wires being fixed within said tension coil spring at plural points, and a means provided in a rear of said tension coil spring for rotatably extending said boring device.

2. A boring device for lining materials for pipe lines according to claim 1, wherein said device is provided with an electric circuit in such a manner that the head element is provided at a top thereof with a thermocouple capable of detecting electromotive force occurring in said thermocouple on its use and transmitting said force to the means for rotatably extending said tension coil spring so as to stop the rotation and extension of said tension coil spring.

3. A boring device for lining materials for pipe lines according to claim 1, wherein said device is provided with an electric circuit in such a manner that said compression coil spring is provided with a proximity switch capable of detecting a change in impedance occurring in said switch on its use and transmitting the change to the means for rotatably extending said tension coil spring so as to stop the rotation and extending of said tension coil spring.

4. A boring device for lining materials for pipe lines according to claim 1, wherein said device is provided in said means for rotatably extending said tension coil spring with an electric circuit capable of electrically detecting a change in rotation speed of a rotor and transmitting the change to said extension means so as to stop the rotation and extension of said tension coil spring.

5. A boring device for lining materials for pipe lines according to claim 1, wherein said plural transmission wires in a loosened state are made by loosely knitting the wires.

6. A boring device for lining materials for pipe lines according to claim 1, wherein said transmission wires are fixed to the tension coil spring by the aid of a thermoplastic resin.

7. A boring device for lining materials for pipe lines according to claim 1, wherein said compression coil spring consists of two compression coil springs connected in series having different spring constants, the compression coil spring connected to the tension coil spring having a spring constant of a value between the spring constant of the tension coil spring and that of the other compression coil spring.

8. A boring device for lining materials for pipe lines according to claim 1, wherein connection or disconnection of the individual springs including the transmission wires being passed therethrough is freely effected by way of a connector.

9. A boring device for lining materials for pipe lines according to claim 1, wherein the head element is connected in the form of a cartridge type connector to said compression coil spring.

10. A boring device for lining materials for pipe lines according to claim 1, wherein each part, from the head element to the connector of each spring, is in the form of a cartridge.

* * * * *